United States Patent [19]

Guiver et al.

[11] Patent Number: 4,894,159

[45] Date of Patent: Jan. 16, 1990

[54] METHOD OF MANUFACTURING A REVERSE OSMOSIS MEMBRANE AND THE MEMBRANE SO PRODUCED

[75] Inventors: Michael D. Guiver, Ottawa; André Y. Tremblay; Chung M. Tam, both of Vanier, all of Canada

[73] Assignee: National Research Council of Canada, Ottawa, Canada

[21] Appl. No.: 361,341

[22] Filed: Jun. 5, 1989

[51] Int. Cl.$^4$ .................. B01D 13/00; B01D 13/04
[52] U.S. Cl. ................... 210/500.41; 264/48; 264/212; 525/535
[58] Field of Search .......... 525/534, 535; 55/16, 55/158; 210/640, 634, 644, 649, 655, 653, 654, 500.21, 500.22, 500.27, 500.28, 500.33, 500.4, 500.41; 264/41, 41.5, 48, 192, 212, 214

[56]  References Cited

U.S. PATENT DOCUMENTS

| | | | |
|---|---|---|---|
| 4,067,805 | 1/1978 | Chaing | 210/640 |
| 4,157,960 | 6/1979 | Chang | 55/158 |
| 4,746,333 | 5/1988 | Peinemann et al. | 55/16 |
| 4,833,219 | 5/1989 | Guiver et al. | 525/534 |

Primary Examiner—Frank Sever

Attorney, Agent, or Firm—Francis W. Lemon

[57] ABSTRACT

Reverse osmosis membranes are manufactured by casting a polysulfone casting composition comprising:
(i) an aromatic polysulfone derivative having repeat units, at least an average of about 20% of which are carboxylated and are of the formula I:

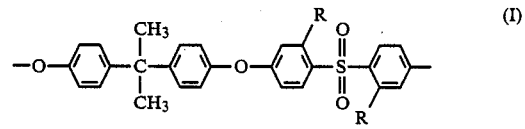

, wherein each R in each formula is ortho to the sulfone, at least one R in each formula is a carboxyl group with any remainder thereof being hydrogen, and
(ii) a solvent for the aromatic polysulfone derivative, then evaporating solvent from the casting composition and then gelling the casting composition into a reverse osmosis membrane. The permeability of the reverse osmosis membrane may be increased by the addition of a non-solvent for the aromatic polysulfone derivative to the casting composition.

10 Claims, No Drawings

METHOD OF MANUFACTURING A REVERSE OSMOSIS MEMBRANE AND THE MEMBRANE SO PRODUCED

This invention relates to a method of manufacturing a reverse osmosis membrane and the membrane so produced.

Reverse osmosis (RO) refers to the process of separating a dissolved solute from its solvent using a semipermeable membrane by applying to the solution a pressure greater than the osmotic pressure of the solution such that the solvent passes through the membrane and the solute remains on the high pressure side of the membrane. The term reverse osmosis is generally applied to separations of low molecular weight solutes which have significant osmotic pressures in solution. Typically, these would include inorganic salts, mono-, di-, tri- or oligosaccharides, amino-acids and oligopeptides, and oligomers such as polyethylene glycol. The approximate range of molecular weight is up to about 1500 (25Å). The process of separating higher molecular weight dissolved solutes from solvent by semipermeable membranes is generally referred to as ultrafiltration. This spans a larger molecular weight range from about 1500 to over 200,000 and the effect of osmotic pressure is negligible. However, the cross-over point between the two processes is indistinct and arbitrary.

Integral asymmetric membranes useful for reverse osmosis and fabricated by the phase inversion method are most commonly made from cellulosic derivatives or from polyamides. While these membranes have good separation and permeability characteristics, they are sensitive to changes in pH and susceptible to thermal or chemical degradation. Aromatic polysulfones (R. N. Johnson, A. G. Farnham, R. A. Clendinning, W. F. Hale and C. N. Merriam, J. Polym. Sci. [A-I],5, 2375 (1967) are high performance thermoplastics with excellent mechanical strength, thermal and chemical stability and film forming qualities which are extensively used for ultrafiltration (UF) membrane materials. One of the most important aromatic polysulfones manufactured commercially is Udel ® of the formula II.

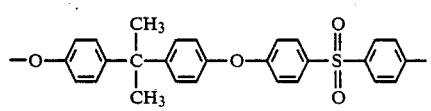
(II)

However, membranes made from Udel polysulfone are unsuitable for RO because of the inability of the polymer to adsorb water molecules in its molecular structure. Consequently, the membranes exhibit low permeability and low salt separations. The introduction of polar functional groups onto the polymer chain increases the hydrophilicity of the material and hence an increase in water permeability.

One approach to prepare hydrophilic polysulfone reverse osmosis membranes has been by using sulfonated polymer obtained from various chemical modification methods ((i) J-P. Quentin, U.S. Pat. No. 3,709,841 (ii) D. R. Lloyd, L. E. Gerlowski, C. D. Sunderland, J. P. Wightman, J. E. McGrath, M. Igbal and Y. Kang, ACS Symp. Ser., 153, 327 (1981) (iii) A. Noshay and L. M. Robeson, J. Appl. Polym. Sci., 20, 1885 (1976)). Generally, these methods do not provide close control over the degree of substitution, and membranes from sulfonated polymer are subject to swelling. The sulfonic acid group is strongly acidic and has a high affinity for water. Therefore the structure of the membrane is susceptible to a change in its environment, resulting in a change in performance. The carboxylic acid group is much less susceptible to hydration and dehydration effects in an aqueous environment than the sulfonic acid group. It is less strongly acidic while still imparting a high degree of hydrophilicity to the polymer. Udel ® polysulfones containing carboxyl groups have been prepared by Guiver et al. ((i) U.S. Pat. No. 4,797,457 Jan. 10, 1989 (ii) U.S. Pat. No. 4,833,219 23 May 1989) and by Himeshima et al. ((i) Jpn. Pat. No. 87,279,805 Dec. 4, 1987 (ii) Jpn. Pat. No. 88,101,425 May 6, 1988.

It has been proposed in Japanese Kokai 101,425 dated May 6, 1988, Y. Himeshima et al., that soil-resistant reverse osmosis membranes for desalination, and ultrafiltration membranes with controllable performance capability can be prepared containing a carboxyl group at any position on the benzene ring of the polysulfone main chain. This is accomplished by the acetylation of Udel ® P3500 polysulfone to give a carboxylated polymer with a glass transition temperature of 181.2° C., inherent viscosity (DMF, 30° C.) 0.158, and carboxyl group 18 m.equivalent/g.

While the carboxylated polysulfone derivative of Y. Himeshima et al. are useful, the carboxylation occurs only on the bis-phenol portion of the polymer chain and positions at which carboxylation can occur are limited and so the range of useful properties obtainable using this process is limited.

It has also already been proposed in U.S. Pat. No. 4,833,219, dated May 23, 1989,M. D. Guiver et al. and in U.S. Pat. No. 4,797,457, dated Jan. 10, 1989, M. D. Guiver et al. column 15, Example 17, to prepare a film from an aromatic polysulfone derivative in the lithium carboxylate ionomer form containing repeat units of the formula III:

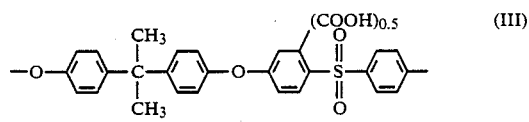
(III)

,wherein a mechanically stirred solution of Udel ® Polysulfone (22.1 g, 0.05 mol) in THF (500 mL) at −700° C. was added n-butyllithium (0.5 mol equiv. 0.025 mol, 2.4 mL of l0.5M) by syringe. The solution was quenched with carbon dioxide by bubbling the gas through the mixture. After 30 minutes the white gel was precipitated into alcohol boiled with water and finally washed with methanol before drying in a vacuum oven.

A non-porous film of the polymer in the Lithium Carboxylate Ionomer form was prepared from a solution of the polymer in N-methyl-2-pyrrolidinone (NMP). the presence of the carboxylate group was confirmed by an absorption band at 1687 cm-1 (C=O) in the infrared spectrum.

The polymer had an average of one carboxylic acid group per two repeat units of Udel Polysulfone. A sheet of the modified polymer in both the acid and salt form displayed improved wetability and dyeability over unmodified Udel. Methylene Blue (Basic Blue 9, C.I. 52015) dyed the modified polymers dark blue compared with light blue for Udel under the same conditions. Basic Red 14 (Sevron) dyed the modified polymers deep red compared with pink for Udel under the same conditions. While these films of an aromatic polysulfone derivative in lithium carboxylate ionomer form are useful, they were not cast in a form that was useful as a reverse osmosis membrane.

There is a need for a carboxylated polysulfone that can be cast as reverse osmosis membranes.

According to the present invention there is provided a method of manufacturing a reverse osmosis membrane; comprising:

(a) casting a polysulfone casting composition on to a support, the polysulfone casting composition comprising:

(i) an aromatic polysulfone derivative having repeat units, at least an average of about 20% of which are carboxylated and are of the formula I:

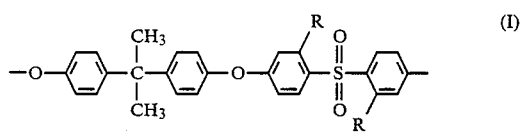

,wherein each R in each formula is ortho to the sulfone, at least one R in each formula is a carboxyl group with any remainder thereof being hydrogen, and (ii) a solvent for the aromatic polysulfone derivative, then (b) evaporating solvent from the cast polysulfone casting composition, then (c) gelling the cast polysulfone casting composition in a gelation medium to form a reverse osmosis membrane therefrom.

The permeability of the reverse osmosis membrane may be improved by adding a non-solvent for the aromatic polysulfone derivative to the casting composition.

The degree of substitution of carboxyl groups on the aromatic polysulfone derivative may be in the range of 0.25 to 1.0 carboxyl groups per repeat unit of the aromatic polysulfone derivative.

The solvent for the aromatic polysulfone may be at least one substance selected from the group consisting of N-methyl-2-pyrrolidinone and dimethylacetamide.

The non-solvent may be at least one substance selected from the group consisting of LiBr, LiCl, LiNO3 and MgCl2

The evaporation in step (b) may be carried out at a temperature range of about 600° C. to 1250° C.

The evaporation in step (b) may carried out at a time in the range of about 1 to 15 minutes.

The concentration of the aromatic polysulfone derivative in the casting solution may be in range of about 17–26% by weight of the solvent.

The molar ratio of non-solvent in the casting solution to the aromatic polysulfone derivative may be in the range of about 0:1 to 5.0:1.

According to a different aspect of the present invention there is provided a reverse osmosis membrane of an aromatic polysulfone derivative having repeat units, at least an average of about 20% of which are carboxylated and are of the formula I:

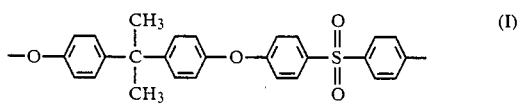

,wherein each R in each formula is ortho to the sulfone, at least one R-in each formula is a carboxyl group with any remainder thereof being hydrogen.

In tests to verify the present invention, one kind of polysulfone polymer membrane material was used, namely Udel polysulfone. This membrane material was cast in flat sheet configuration.

The solvents for the polysulfone derivatives were aprotic solvents, i.e. N-methyl-pyrrolidinone (NMP) and dimethylacetamide (DMAc).

The additives used as non-solvents in the tests were inorganic salts, i.e. LiCl, LiBr, LiNO3 and MgCl2. These additives which act as pore formers are non-solvents for the aromatic polysulfone derivatives, but are soluble in the solvent for the aromatic polysulfone derivatives. In effect, they change the dissolution power of the solvent as well as altering and generally increasing the permeability of the membrane.

In the tests, the casting composition was cast on to a glass plate. However, membranes with similar permeabilities and separation characteristics can be fabricated from casting compositions cast on surfaces other than glass, for example, porous backing material or metal.

Solvent was evaporated from the cast film using a thermal gradient. The aromatic polysulfone derivative, remaining solvent and if used, non-solvent remain deposited on to the support.

Substantially al of the remaining solvent and any non-solvent was removed in the gelation step.

EXAMPLES 1 to 5

General details for polymer modification

The reaction flask was a 5L glass vessel with a wide neck flange fitting which was equipped with a mechanical stirrer, gas inlet, bubbler, thermocouple, and septum. The polymer and apparati were dried prior to use. Reactions were performed with substantially anhydrous tetrahydrofuran (THF) solutions of polymer under an inert atmosphere, in this case argon. n-Butyllithium was obtained commercially.

$^1$H-NMR spectra were recorded on a Bruker AM-400 400MHz spectrometer at room temperature. Samples were dissolved in CDCl3 with an internal TMS standard. Chemical shifts delta are expressed in ppm. and the spectral resonances are designated: singlet (s.), doublet (d.), multiplet (m.) and broadened (br.). Unsubstituted, mono-substituted and di-substituted repeat units are designated U, M and D respectively. Protons H-a and H-b are protons on the bisphenol portion of the polymer, H-a being ortho to ether. H-c, H-d and H-e are protons on the phenylsulfone portion of the polymer; H-c are protons ortho to ether, H-dare protons ortho to sulfone and H-e are protons ortho to carboxyl groups.

Infrared measurements were made on a Perkin-Elmer 683 spectrometer Samples were cast as dense films from carboxylic acid polysulfone derivative solutions in NMP.

Polysulfone derivatives were characterized by methyl ester derivatives. Chloroform soluble methyl ester derivatives were prepared from the lithium carboxylate polysulfone derivatives to determine the degree of substitution by $^1$H-NMR spectroscopy. This was accomplished by comparative integration of the carboxymethyl signals versus the isopropylidene backbone methyl signals. 5 g. of lithium carboxylate polysulfone derivative were dissolved in DMSO (45 mL) at 800° C. Excess iodomethane was added and the solution was stirred for a short time during which time it became less viscous. The esterified polysulfone derivative was recovered by precipitating the hot solution into methanol in a blender, then washing it with methanol and hot water. Intrinsic viscosity [eta] was measured at 25.00° C. in NMP. $[\eta]$ (Unmodified polymer)=0.46, $[\eta]$(methyl ester) =0.46.

NMR Unmodified polysulfone: $\delta=7.85$ H-d (4H d.); $\delta=7.24$ H-b (4H d.); $\delta=7.00$ H-c (4H d.); $\delta=6.94$ H-a (4H d.); $\delta=1.69$ CMe$_2$ (6H s.).

NMR (e.g. 0.62) Carboxylated methyl ester polysulfone: $\delta=8.02$ H-d (M),(d.); $\delta=7.90$ H-d (M),(d.); $\delta=7.85$ H-d (U),(d.); $\delta=7.24$ H-b (U,M),(br.d.); $\delta=7.13-6.93$ H-e/H-c/H-a (U,M),(m.); $\delta=3.91$Me (M),(s.); $\delta=3.87$Me (D),(s.); $\delta=1.69$ CMe$_2$ (6H s.).

IR C=O str. (COOCH$_3$ form) 1735 cm$^{-1}$

EXAMPLE 1 n-Butyllithium (0.62 eq., 0.31 mol, 10.0M) was injected dropwise into a solution of polysulfone (221 g, 0.50 mol) in THF (2L) cooled to −500° C. The mixture initially turned green, then later developed a red-brown colouration and became very viscous. Following the addition, the solution was stirred for 15 minutes and then several 1 lb. blocks of freshly prepared dry ice were added to the lithiated polysulfone and vigourously mixed by hand. The resulting thick whitish polysulfone derivative precipitate was allowed to warm to room temperature and then residual THF was decanted off. Carboxylated polysulfone derivative was recovered in the lithium salt form by agitating the precipitate with ethanol in a Waring blender and then drying it in an oven. The yield was 220 g. IR C=O str. (COO−Li+- form) 1687 cm$^{-1}$. The polysulfone derivative was converted to the acid form for the membrane materials by treatment with dilute hydrochloric acid. The degree of substitution (DS) was determined to be an average of 0.62 carboxyl groups per repeat unit of polysulfone derivative chain by $^1$H-NMR measurement of the methyl ester derivative.

EXAMPLE 2

Udel polysulfone was modified according to the general procedure of example 1, using 0.25 mol eq. n-butyllithium instead of 0.62 mol eq.. The polysulfone derivative contained an average of 0.25 carboxyl groups per repeat unit of polymer chain.

EXAMPLE 3

Udel polysulfone was modified according to the general procedure of example 1, using 0.40 mol eq. n-butyllithium instead of 0.62 mol eq.. The polysulfone derivative contained an average of 0.40 carboxyl groups per repeat unit of polymer chain.

EXAMPLE 4

Udel polysulfone was modified according to the general procedure of example 1, using 0.52 mol eq. n-butyllithium instead of 0.62 mol eq.. The polysulfone derivative contained an average of 0.52 carboxyl groups per repeat unit of polymer chain.

EXAMPLE 5

Udel polysulfone was modified according to the general procedure of example 1, using 0.83 mol eq. n-butyllithium instead of 0.62 mol eq.. The polysulfone derivative contained an average of 0.82 carboxyl groups per repeat unit of polymer chain.

EXAMPLES 6 to 20 General membrane tests

The general procedure for preparing casting solutions, casting membranes and testing them were as follows: Casting solutions were made using either N,N-dimethylacetamide (DMAc) or N-methyl-2-pyrrolidinone (NMP) as the solvent in combination with optional non-solvents selected from LiCl, LiBr, LiNO$_3$ and MgCl$_2$. The polysulfone derivatives and lithium salts were thoroughly dried and handled in a dry box while the solutions were prepared. These mixtures were rolled overnight in glass bottles until uniform casting dopes were obtained. The solutions were spread on glass plates under a dry atmosphere using a casting blade having a 0.254 mm (10 thou.) gap. Films were evaporated in a convection oven at various temperatures and times and then gelled in ice water. Solvent was allowed to leach from the membranes for a minimum period of 48 hours prior to testing. The polysulfone derivative/solvent ratio was calculated on a weight basis. The non-solvent/polysulfone derivative ratio was a molar ratio; 1 mole of polymer was taken to be the average molecular weight of one repeat unit. The active area of membrane test cell was 10.75 cm$^2$ and the feed pressure was 500 psig. Unless otherwise specified, the feed was 3500 ppm NaCl. PWP is the Pure Water Permeability in g/hour and PR is the Product Rate through the 10.75 cm$^2$ membrane in g/hour. PWP and PR values in U.S. gallons/ft.$^2$.day may be obtained by multiplying the listed values by a factor of 0.548. PWP and PR values in Litres/m2.day may be obtained by multiplying the listed values by a factor of 22.325. Separation for NaCl was determined by conductance. Membranes were pressurized with pure water for 24 hours prior to testing.

EXAMPLE 6

The fabrication and testing of membranes in this example were in accordance with the procedure outlined in the general membrane tests. This example demonstrates the change in separation performance with respect to a change in degree of carboxylation for a series of membranes cast from 20% solutions of polysulfone derivative in NMP without an additive. The dopes were cast and then evaporated for 8 minutes at a temperature of 950° C. before gelation. The membranes were compared to unmodified polysulfone (DS=0).

| DS | PWP | PR | % Sep |
| --- | --- | --- | --- |
| 0.00 | 6.13 | 5.44 | 21.65 |
| 0.25 | 77.11 | 60.70 | 57.99 |
| 0.40 | 4.25 | 3.78 | 77.01 |
| 0.52 | 1.80 | 1.50 | 92.07 |

EXAMPLE 7

The fabrication and testing of membranes in this example were in accordance with the procedure outlined in the general membrane tests. This example demonstrates the change in separation performance with respect to a change in degree of carboxylation for a series of membranes cast from 20% solutions of polysulfone derivative in DMAc with a LiCl additive (1.30:1 ratio to polysulfone derivative). The dopes were cast and then evaporated for 10 minutes at a temperature of 950° C. before gelation. The membranes were compared to unmodified polysulfone (DS=0).

| DS | PWP | PR | % Sep |
|------|------|------|-------|
| 0.00 | 0.00 | 0.00 | 0.00 |
| 0.25 | 0.00 | 0.00 | 0.00 |
| 0.40 | 1.07 | 1.09 | 97.89 |
| 0.52 | 0.83 | 0.81 | 99.89 |
| 0.62 | 1.36 | 1.44 | 99.42 |
| 0.82 | 0.48 | 0.51 | 99.99 |

EXAMPLE 8

The fabrication and testing of membranes in this example were in accordance with the procedure outlined in the general membrane tests. This example compares the effect of different solvent systems on membrane performance. All membranes were formulated from cast 20% solutions of 0.40 carboxylated polysulfone containing various non-solvents and evaporated at 950° C. for 10 minutes before gelation. In the solvent/non-solvent system, LiCl was used in a 1.20:1 ratio to polysulfone derivative. The modified membranes were compared to Udel polysulfone membranes cast under similar conditions.

| Solvent | PWP | PR | % Sep |
|---------|-------|-------|-------|
| DMAc | 19.48 | 10.48 | 8.52 |
| DMAc/LiCl | 2.19 | 2.03 | 93.15 |
| DMAc/LiCl | 3.40 | 3.11 | 90.68 |
| DMAc/LiCl | 2.91 | 2.69 | 93.07 |
| NMP | 3.25 | 2.61 | 90.22 |
| NMP/Udel | 0.00 | 0.00 | 0.00 |
| DMAc/LiCl/Udel | 0.00 | 0.00 | 0.00 |

EXAMPLE 9

The fabrication and testing of membranes in this example were in accordance with the procedure outlined in the general membrane tests. This example compares the effect of different non-solvent systems on membrane performance. All membranes were formulated from cast 20% DMAc solutions of 0.62 carboxylated polysulfone evaporated at 700° C. for 5 minutes prior to gelation. The non-solvent/polysulfone derivative ratio was 0.6:1.

| Non-solvent | PWP | PR | % Sep |
|-------------|--------|--------|-------|
| LiBr | 27.53 | 25.91 | 69.79 |
| LiCl | 165.43 | 133.80 | 45.18 |
| LiNO$_3$ | 43.79 | 42.00 | 57.33 |
| MgCl$_2$ | 302.40 | 217.80 | 34.74 |

EXAMPLE 10

The fabrication and testing of membranes in this example were in accordance with the procedure outlined in the general membrane tests. This example compares the effect of different non-solvent systems on membrane performance. All membranes were formulated from cast 20% NMP solutions of 0.62 carboxylated polysulfone containing various non-solvents and evaporated at 700° C. for 5 minutes prior to gelation. The non-solvent to polysulfone derivative ratio was 0.6:1.

EXAMPLE 11

The fabrication and testing of membranes in this example were in accordance with the procedure outlined in the general membrane tests. This example demonstrates the effect of different temperatures on membrane performance. Membranes were formulated from cast 18% DMAc solutions of 0.25 carboxylated polysulfone evaporated at various temperatures for 2 minutes. The non-solvent/polysulfone derivative ratio was 0.24:1.

| Non-solvent | PWP | PR | % Sep |
|-------------|--------|--------|-------|
| LiBr | 264.13 | 155.33 | 37.62 |
| LiBr | 294.15 | 165.45 | 36.65 |
| LiCl | 651.30 | 395.40 | 20.45 |
| LiNO$_3$ | 545.28 | 312.75 | 25.91 |
| MgCl$_2$ | 406.63 | 240.00 | 29.44 |

EXAMPLE 12

The fabrication and testing of membranes in this example were in accordance with the procedure outlined in the general membrane tests. This example demonstrates the effect of different temperatures on membrane performance. Membranes were formulated from cast 25% DMAc solutions of 0.25 carboxylated polysulfone evaporated at various temperatures for 2 minutes prior to gelation. The LiCl non-solvent/polysulfone derivative ratio was 0.24:1.

| Temp | PWP | PR | % Sep |
|------|--------|--------|-------|
| 60 | 361.40 | 335.00 | 13.03 |
| 60 | 196.53 | 184.00 | 30.53 |
| 80 | 118.32 | 102.00 | 47.33 |
| 80 | 86.97 | 77.03 | 51.50 |
| 100 | 59.19 | 54.66 | 60.32 |
| 120 | 41.45 | 39.45 | 58.16 |

EXAMPLE 13

The fabrication and testing of membranes in this example were in accordance with the procedure outlined in the general membrane tests. This example compares the effect of different evaporation times on membrane performance. Four series of membranes were formulated from cast 20% DMAc solutions of 0.62 carboxylated polysulfone containing the following four ratios of LiCl non-solvent to polysulfone derivative ratio (N:P): 1.82:1; 2.13:1; 2.44:1; 3.04:1. The cast dopes were evaporated at 950° C. for either 6, 8, or 10 minutes prior to gelation.

| N:P | Time | PWP | PR | % Sep |
|------|------|-------|-------|-------|
| 1.82 | 6 | 5.42 | 5.36 | 100 |
| 1.82 | 10 | 3.47 | 3.29 | 95.43 |
| 1.82 | 10 | 1.57 | 1.44 | 97.74 |
| 2.13 | 8 | 10.99 | 9.90 | 92.79 |
| 2.13 | 10 | 5.31 | 5.13 | 97.11 |
| 2.44 | 8 | 27.71 | 24.84 | 86.08 |
| 2.44 | 10 | 8.14 | 7.91 | 96.10 |
| 3.04 | 6 | 48.63 | 43.07 | 84.60 |
| 3.04 | 8 | 90.57 | 80.42 | 69.31 |
| 3.04 | 10 | 67.66 | 54.12 | 88.38 |

EXAMPLE 14

The fabrication and testing of membranes in this example were in accordance with the procedure outlined in the general membrane tests. This example contrasts the effect of different non-solvent to polysulfone derivative ratios on membrane performance. Five series of membranes were formulated from cast 20% DMAc solutions of 0.62 carboxylated polysulfone containing the following four ratios of LiCl non-solvent to polysulfone derivative ratio (N:P): 1.82:1; 2.13:1; 2.44:1; 2.74; 3.04:1. The cast dopes were evaporated at 950° C. for 8 minutes prior to gelation.

| N:P | PWP | PR | % Sep |
|---|---|---|---|
| 1.35 | 1.02 | 0.95 | 92.60 |
| 2.13 | 10.99 | 9.90 | 92.79 |
| 2.44 | 27.71 | 24.84 | 86.08 |
| 2.74 | 31.86 | 29.18 | 88.69 |
| 3.04 | 48.63 | 43.07 | 84.60 |
| 3.04 | 90.57 | 80.42 | 69.31 |

EXAMPLE 15

The fabrication and testing of membranes in this example were in accordance with the procedure outlined in the general membrane tests. This example contrasts the effect of different non-solvent to polysulfone derivative ratios on membrane performance. Five series of membranes were formulated from cast 20% DMAc solutions of 0.62 carboxylated polysulfone containing the following four ratios of LiCl non-solvent to polysulfone derivative ratio (N:P): 1.82:1; 2.13:1; 2.44:1; 2.74; 3.04:1. The cast dopes were evaporated at 950° C. for 10 minutes prior to gelation.

| N:P | PWP | PR | % Sep |
|---|---|---|---|
| 1.83 | 3.47 | 3.29 | 95.43 |
| 1.82 | 1.57 | 1.44 | 97.74 |
| 1.35 | 0.48 | 0.51 | 99.99 |
| 2.13 | 5.31 | 5.13 | 97.11 |
| 2.44 | 8.14 | 7.91 | 96.10 |
| 2.74 | 23.06 | 20.25 | 90.59 |
| 3.04 | 67.66 | 54.12 | 88.38 |

EXAMPLE 16

The fabrication and testing of membranes in this example were in accordance with the procedure outlined in the general membrane tests. This example demonstrates the effect of different polysulfone derivative/solvent (P/S) concentrations on membrane performance. Series of membranes were formulated from cast DMAc solutions of 0.62 carboxylated polysulfone containing the following four ratios of LiCl non-solvent to polysulfone derivative ratio (N:P): 1.82:1; 2.44:1; 3 04:1. The polysulfone derivative/solvent ratios were varied from 19.56 to 25.54 w/w %. The cast dopes were evaporated at 950° C. for 6, 8, or 10 minutes prior to gelation.

| N:P | Time | P/S | PWP | PR | % Sep |
|---|---|---|---|---|---|
| 1.82:1 | 6 | 20 | 5.42 | 5.36 | 100 |
| 1.82:1 | 6 | 25 | 9.95 | 8.85 | 84.60 |
| 2.44:1 | 8 | 19.56 | 20.41 | 16.45 | 92.90 |
| 2.44:1 | 8 | 20 | 27.71 | 24.84 | 86.08 |
| 2.44:1 | 8 | 22.50 | 31.09 | 26.74 | 95.98 |
| 2.44:1 | 8 | 25.54 | 8.79 | 7.98 | 88.88 |
| 1.82:1 | 10 | 20 | 3.47 | 3.29 | 95.43 |
| 1.82:1 | 10 | 25 | 2.47 | 2.10 | 100.00 |
| 3.04:1 | 10 | 20 | 67.66 | 54.12 | 88.38 |
| 3.04:1 | 10 | 25 | 276.49 | 201.25 | 16.28 |

EXAMPLE 17

The fabrication and testing of membranes in this example were in accordance with the procedure outlined in the general membrane tests. This example illustrates the use of these membranes for separations other than sodium chloride. The separation and permeability of a series of membranes were examined using 1000 ppm CaCl$_2$. Series of membranes having different degrees of substitution were formulated from cast 20% DMAc solutions of carboxylated polysulfone containing a LiCl non-solvent to polysulfone derivative ratio of 1.30:1. The cast dopes were evaporated at 950° C. for 10 minutes prior to gelation.

| DS | PWP | PR | % Sep |
|---|---|---|---|
| 0 | 0 | 0 | 0 |
| 0.25 | 0 | 0 | 0 |
| 0.40 | 1.10 | 1.17 | 96.23 |
| 0.52 | 0.85 | 0.70 | 92.77 |
| 0.62 | 1.57 | 1.58 | 99.99 |

EXAMPLE 18

The fabrication and testing of membranes in this example were in accordance with the procedure outlined in the general membrane tests. This example illustrates the use of these membranes for separations other than sodium chloride. The separation and permeability of a series of membranes were 5 examined using 1000 ppm CaCl$_2$. Series of membranes were formulated from cast 20% DMAc solutions of 0.62 carboxylated polysulfone containing various LiCl non-solvent to polysulfone derivative ratios (N:P) ranging from 3.0:1 to 5.0:1. The cast dopes were evaporated at 950° C. for either 8 or 10 minutes prior to gelation.

| N:P | Time | PWP | PR | % Sep |
|---|---|---|---|---|
| 3.0 | 8 | 8.95 | 0.21 | 80.20 |
| 3.5 | 8 | 10.80 | 8.22 | 86.19 |
| 4.0 | 8 | 27.11 | 19.47 | 73.25 |
| 4.5 | 8 | 32.43 | 22.19 | 74.70 |
| 3.0 | 10 | 3.56 | 3.12 | 91.69 |
| 3.5 | 10 | 5.56 | 4.64 | 94.17 |
| 4.0 | 10 | 8.60 | 6.94 | 92.06 |
| 4.5 | 10 | 22.28 | 14.53 | 80.75 |
| 5.0 | 10 | 88.79 | 59.31 | 40.64 |

EXAMPLE 19

The fabrication and testing of membranes in this example were in accordance with the procedure outlined in the general membrane tests. This example serves to illustrate the use of these membranes for separations other than inorganic salts, and that they are useful for separations of other solutes in the low molecular weight range. The separation and permeability of a series of membranes were examined using a sequence of low molecular weight water soluble polyethylene glycol organic polymers and low molecular weight sugars. The concentration of the solutes was 100 ppm. A high permeability, low sodium chloride separation membrane formulated from a cast 20% DMAc solution of 0.62 carboxylated polysulfone containing a LiCl non-solvent to polysulfone derivative ratio 0.6:1 was selected. The cast dopes were evaporated at 70° C. for 5 minutes prior to gelation.

| Solutes | PWP | PR | % Sep |
|---|---|---|---|
| 3500 ppm NaCl | 165.43 | 133.80 | 45.18 |
| Ethylene Glycol | 68.06 | 65.91 | 24.94 |
| Glycerol | 66.09 | 65.31 | 36.24 |
| PEG 200 | 105.43 | 94.97 | 63.66 |

| Solutes | PWP | PR | % Sep |
|---|---|---|---|
| PEG 300 | 96.17 | 87.43 | 77.79 |
| PEG 400 | 65.49 | 63.86 | 89.69 |
| PEG 600 | 64.97 | 63.43 | 93.39 |
| PEG 2000 | 67.80 | 66.17 | 98.72 |
| Raffinose | 75.77 | 68.91 | 91.68 |
| Sorbitol | 74.74 | 67.11 | 61.76 |
| Sucrose | 63.17 | 61.97 | 85.29 |
| Xylitol | 64.71 | 62.91 | 56.85 |

EXAMPLE 20

The fabrication and testing of membranes in this example were in accordance with the procedure outlined in the general membrane tests. This example serves to illustrate the use of these membranes for separations other than inorganic salts, and that they are useful for other separations of solutes in the low molecular weight range. The separation and permeability of a series of membranes were examined using a sequence of higher molecular weight water soluble polyethylene glycol (PEG), dextran and polyacrylic acid (PAA) organic polymers. The concentration of the solutes was 100 ppm. A high permeability, low sodium chloride separation membrane formulated from a cast 20% NMP solution of 0.62 carboxylated polysulfone containing a LiCl non-solvent to polysulfone derivative ratio 0.6:1 was selected. The cast dopes were evaporated at 700° C. for 5 minutes prior to gelation.

| Solute | PWP | PR | % Sep |
|---|---|---|---|
| 3500 ppm NaCl | 651.30 | 395.40 | 20.45 |
| PAA 6000 | 367.80 | 409.80 | 96.80 |
| Dextran 9000 | 414.90 | 279.60 | 91.33 |
| PEG 2000 | 428.70 | 329.10 | 48.78 |
| PEG 3000 | 323.40 | 274.20 | 89.18 |
| PEG 4000 | 342.60 | 254.70 | 89.38 |
| PEG 15000 | 323.70 | 208.80 | 97.11 |
| Sorbitol | 318.60 | 281.10 | 17.72 |
| Sucrose | 434.70 | 350.70 | 40.09 |

SUMMARY OF RESULTS

Examples 1 to 5 showed the procedures used for carboxylation of Udel polysulfone according to U.S. Pat. Nos. 4,797,457 and 4,833,219, Guiver et al.

Examples 6 and 7 showed that increased NaCl separation was obtained as the degree of carboxylation increased. This observation was valid for both NMP and DMAc solvent systems. A minimum degree of carboxylation of at least an average of about 20% of the repeating units of the polysulfone derivative was required before water permeation and high salt separation occurred.

Example 8 illustrated the effect of different solvents on carboxylated polysulfone membrane performance. DMAc required a non-solvent, e.g. LiCl, to produce a membrane giving good salt separation. DMAc/LiCl and NMP were both good solvent systems of making reverse osmosis membranes. The carboxylated polysulfones were compared to a control polysulfone membrane cast under the same conditions and no permeability was obtained for the membrane of the untreated polysulfone.

Examples 9 and 10 demonstrated that other inorganic salts can be added to the solvent. Adding LiCl, LiBr, LiNO$_3$, or MgCl$_2$ to DMAc or NMP produced membranes with higher permeability and separation.

Examples 11 and 12 showed the effect of increasing the evaporation temperature on membrane performance. For this set of experiments, separation increased as the temperature increased. The tests were conducted on membranes cast from two different polysulfone derivative concentrations.

Example 13 showed the effect of evaporation temperature on membrane performance. For this set of experiments, the separation increased and the permeability decreased as the evaporation time was longer.

Examples 14 and 15 showed the effect of non-solvent concentration on the membrane performance. The molar ratio of non-solvent to polysulfone derivative was varied. The separation decreased while the permeability increased with increase in the non-solvent to polysulfone derivative ratio.

Example 16 showed that different polysulfone derivative concentrations can produce RO membranes. Polysulfone derivative to solvent ratios were found that gave both high permeability and high separation.

Example 17 demonstrated that the membranes produced are a not limited to separating monovalent salts. A 1000 ppm concentration of CaCl$_2$ was tested with membranes made from polysulfone derivatives having different degrees of carboxylation. A minimum degree of carboxylation for the polysulfone derivative was necessary before the membrane could separate the CaCl$_2$. An increase in degree of substitution was found to increase the separation for this divalent salt.

Example 18 showed the effect of the ratio of non-solvent to polysulfone derivative for two evaporation times on the membrane performance for separating CaCl$_2$ solution. The results were similar to those of examples 14 and 15. As the non-solvent to polysulfone derivative ratio increased, the permeability increased but the separation decreased.

Examples 19 and 20 showed that membranes with high permeability but low NaCl separation were useful for the separation of low molecular weight solutes such as sugars and polyethylene glycols.

As a general statement, the examples showed that a wide range of membranes having different characteristics could be produced according to the present invention by controlling the casting compositions and conditions.

It is within the scope of the present invention for the aromatic polysulfone derivative of the casting composition to be admixed with other polymers such as, for example Udel polysulfone of the formula II.

What is claimed is:

1. A method of manufacturing a reverse osmosis membrane; comprising:
 (a) casting a polysulfone casting composition on to a support, the polysulfone casting composition comprising:
  (i) an aromatic polysulfone derivative having repeat units, at least an average of about 20% of which are carboxylated and are of the formula I:

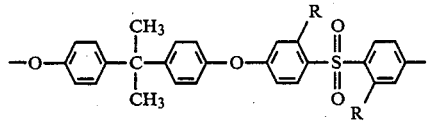

, wherein each R in each formula is ortho to the sulfone, at least one R in each formula is a carboxyl group with any remainder thereof being hydrogen, and (ii) a solvent for the aromatic polysulfone derivative, then (b) evaporating solvent from the cast polysulfone casting composition, then (c) gelling the cast polysulfone casting composition in a gelation medium to form a reverse osmosis membrane therefrom.

2. A method according to claim 1, wherein the permeability of the reverse osmosis membrane is improved by adding a non-solvent for the aromatic polysulfone derivative to the casting composition.

3. A method according to claim 2, wherein the non-solvent is at least one substance selected from the group consisting of LiBr, LiCl, LiNO$_3$ and MgCl$_2$.

4. A method according to claim 2, wherein the molar ratio of non-solvent in the casting solution to the aromatic polysulfone derivative is in the range of about 0:1 to 5.0:1.

5. A method according to claim 1, wherein the degree of substitution of carboxyl groups on the aromatic polysulfone derivative is in the range of 0.25 to 1.0 carboxyl groups per repeat unit of the aromatic polysulfone derivative.

6. A method according to claim 1, wherein the solvent for the aromatic polysulfone derivative is at least one substance selected from the group consisting of N-methyl-2-pyrrolidinone and dimethylacetamide.

7. A method according to claim 1, wherein the evaporation in step (b) is carried out at a temperature range of about 600° C. to 1250° C.

8. A method according to claim 1, wherein the evaporation in step (b) is carried out at a time in the range of about 1 to 15 minutes.

9. A method according to claim 1, wherein the concentration of the aromatic polysulfone derivative in the casting solution is in range of about 17–26% by weight of the solvent.

10. A reverse osmosis membrane of an aromatic polysulfone derivative having repeat units, at least an average of about 20% of which are carboxylated and are of the formula I:

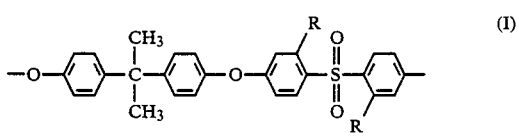

wherein each R in each formula is ortho to the sulfone, at least one R in each formula is a carboxyl group with any remainder thereof being hydrogen.

* * * * *

UNITED STATES PATENT AND TRADEMARK OFFICE
CERTIFICATE OF CORRECTION

PATENT NO. : 4,894,159
DATED : January 16, 1990
INVENTOR(S) : Michael D. Guiver et al It is certified that error appears in the above-identified patent and that said Letters Patent is hereby corrected as shown below:

column 2, line 48, replace "-700°C" by "-70°C", column 2, line 58, replace "cm-1" by "$cm^{-1}$", column 3, line 48, replace "600°C. to 1250°C" by "60°C. to 125°C", column 4, line 68, replace "800°C" by "80°C", column 5, line 21, replace "-500°C" by "-50°C", column 6, lines 46 and 66, replace "950°C" by "95°C", column 7, lines 18, replace "950°C" by "95°C", column 7, lines 42 and 61, replace "700°C" by "70°C", column 8, line 45, replace "950°C" by "95°C", column 9, lines 3, 25 and 50, replace "950°C" by "95°C", column 10, line 7, replace "950°C" by "95°C"

column 10, lines 7 and 30, replace "950°C" by "95°C", column 11, line 29, replace "700°C" by "70°C", and column 14, line 9, replace "600°C. to 1250°C" by "60°C. to 125°C".

Signed and Sealed this

Fifteenth Day of January, 1991

Attest:

HARRY F. MANBECK, JR.

*Attesting Officer*      *Commissioner of Patents and Trademarks*